June 13, 1933.  I. STANLEY ET AL  1,913,570
MEASURING AND RECEPTACLE FILLING APPARATUS
Filed July 28, 1928  4 Sheets-Sheet 1

Fig. 1.

INVENTORS
I. Stanley and E.L. Jones
BY
John O. Seifert
ATTORNEY June 13, 1933.   I. STANLEY ET AL   1,913,570
MEASURING AND RECEPTACLE FILLING APPARATUS
Filed July 28, 1928    4 Sheets-Sheet 2

INVENTORS
I. Stanley and E. L. Jones
BY
ATTORNEY

Patented June 13, 1933

1,913,570

UNITED STATES PATENT OFFICE

IRVING STANLEY, OF NEW YORK, AND ELLIS L. JONES, OF LONG ISLAND CITY, NEW YORK, ASSIGNORS, BY MESNE ASSIGNMENTS, TO AMERICAN SEALCONE CORPORATION, OF NEW YORK, N. Y., A CORPORATION OF NEW YORK

MEASURING AND RECEPTACLE FILLING APPARATUS

Application filed July 28, 1928. Serial No. 295,914.

This invention relates to apparatus for filling receptacles or containers with a predetermined or measured quantity of material, such as a liquid from a tank to receptacles positioned relative to outlet means from the tank, and it is the principal object of the invention to provide a series of material delivering and filling means, means to position a series of receptacles to be filled relative to the filling means and to transfer the filled receptacles from said latter position, as onto a conveyor juxtaposed and movable relative to the filling means.

Another object of the invention is to provide a pan to receive drippings from the outlet means, said pan being normally urged to position away from the outlet means and adapted to be positioned below the outlet means to receive drippings therefrom when receptacles are transferred away from the outlet means and prevent a deposit and accumulation of such drippings on the receptacle positioning and transferring means.

A further object of the invention is to provide actuating mechanism to simultaneously position a series of receptacles to be filled relative to the outlet means, to actuate the material measuring means to deliver a predetermined quantity of material to the receptacles positioned relative to the outlet means, transfer the filled receptacles from the outlet means, and position the drip pan to and away from the outlet means in timed sequence.

Another object of the invention is to provide improved outlet means from the tank to render the same easily accessible and readily removable for cleaning or other purposes.

A further object of the invention is to provide improved inlet means for the material to the tank arranged with a float controlled valve to maintain a predetermined quantity of material in the tank constructed and arranged to be easily accessible and readily removable for cleaning or other purposes.

Other objects and advantages will hereinafter appear.

In carrying out the invention there is provided a tank supported in an elevated position relative to a table and arranged with valve controlled inlet means and a series of outlet means extended from the bottom of the tank. A measuring device is provided for each of the outlet means to deliver a predetermined quantity of material, in the present instance a liquid, such as milk, to receptacles manually positioned on the table below said outlet means, said positioning being gauged by a slide member arranged with a series of gauge members corresponding in arrangement and number to the outlets. After a predetermined quantity of material is delivered to the receptacles, the slide is actuated in timed sequence with the measuring devices to transfer the receptacles from said filling position, as onto a conveyor travelling in a plane parallel to the receptacle supporting table to transport the receptacles to apparatus to apply a closure to the open ends of the receptacles or containers. To prevent the material from dripping from the outlet means onto the table and positioning and transferring slide during the receptacle transferring movement of the latter, a drip pan is provided normally positioned away from the outlet means during the receptacle filling operation and adapted to be positioned below the outlet means and receive drippings therefrom during the actuation of the slide to transfer filled receptacles from the outlet means and the return thereof to initial position to aline receptacles with the outlet means.

In the drawings accompanying and forming a part of this application.

Like references designate like parts throughout the different views of the drawings.

Figures 7, 8, 9, 10, 11, 12:
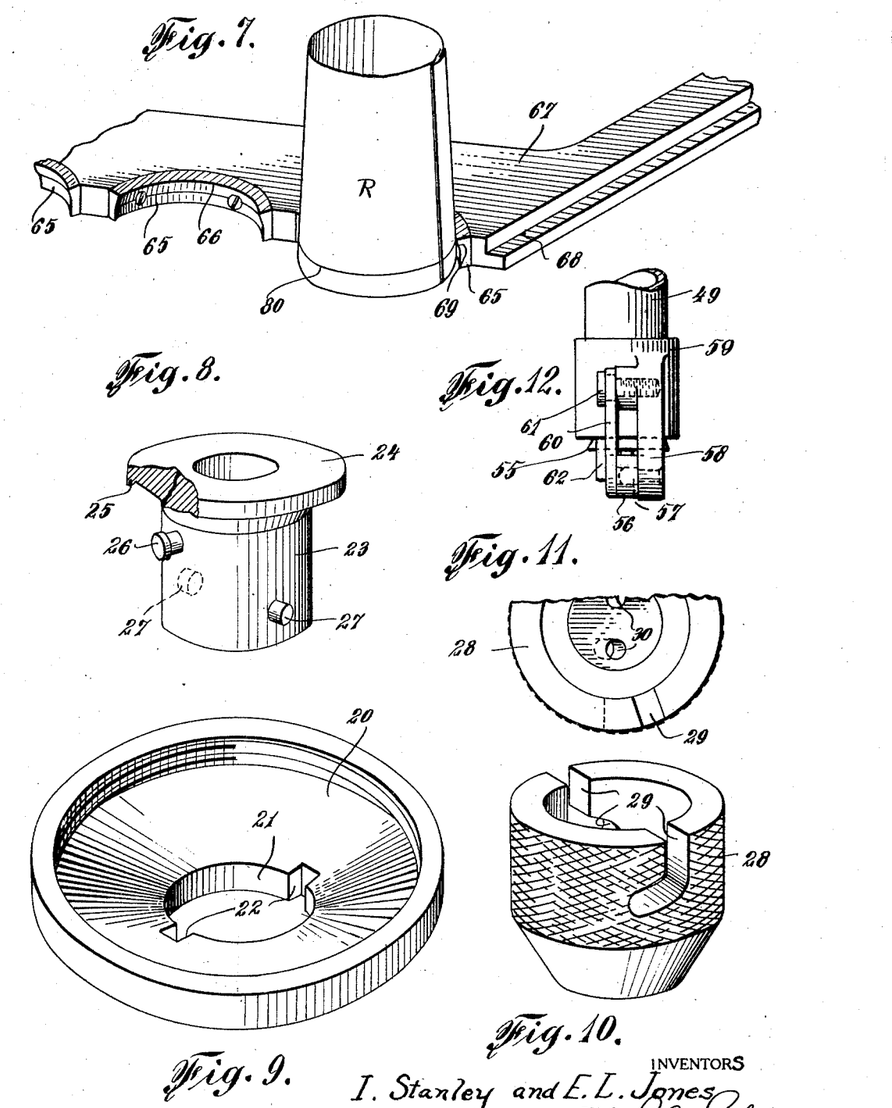
Figure 7 is a fragmentary perspective view of a portion of the receptacle positioning and transferring means and showing the manner of gauging a receptacle thereby on the table relative to the filling means.
Figure 8 is a perspective view of a sleeve comprising a part of the discharge nozzle and partly broken away to show the construction thereof.
Figure 9 is a perspective view of the bottom of an outlet means from the tank.
Figure 10 is a perspective view of a nipple member of the discharge nozzle.
Figure 11 is a fragmentary plan view looking at the top of Figure 10 to show the arrangement of the discharge orifice in the nipple.
Figure 12 is a detail view of the support for a valve member and float for the material inlet means to the tank shown in Figure 1.

The embodiment of the invention illustrated comprises a liquid carrying tank 13 supported from and in superposed relation to a table 14 by standards 15, said table being supported by standards 16 from a suitable base. The tank is arranged with a series of perforations 17 in the bottom thereof and has a plate 18 secured to the bottom arranged with threaded perforations corresponding and in alinement with the perforations in the tank but of larger diameter for the threaded engagement of cylindrical receptacles 19 with the threaded end engaged in the plate perforations constituting a passage from the tank to the receptacles and the edges abutting against the bottom forming a liquid tight seal, said receptacles comprising a part of proportional filling means. The opposite ends of the receptacles are reduced in diameter and externally threaded for the removal mounting of and the forming of a tight seal joint with conical bottom members 20 for the receptacles, said bottom members (Figure 9) having a central opening 21 through the apex of said members and an outwardly extended flange with recesses 22, preferably diametrically oppositely disposed, in the wall of the openings for the mounting of outlet means and discharge nozzles. The outlet means and discharge nozzles comprise sleeves 23 arranged with an annular flange 24 at one end thereof and having a lip 25 projecting from the underface at the periphery of the flange, said sleeves being engaged in the openings 21 from the interior of the receptacles. A pair of pins 27 are fixed in and extend laterally from the sleeves, said pins being arranged to pass through the recesses 22 in the wall of the openings 21, and each sleeve is arranged with a third laterally extending pin for engagement in one of the recesses 22 to hold the sleeves against rotation. The nozzles, in the form of nipples or caps 28 have a bore portion of a diameter the same as the sleeves to permit the nipples to be engaged on the sleeves, and the wall of the bore adjacent the closed end converging toward said end. The nipples have angular slots, in the nature of bayonet slots 29, cut into the end therein for engagement of the sleeve pins 27 to form a bayonet joint connection with the sleeves. The engagement of the nipples on the sleeves with the sleeve pins engaged in the slot 29 and the imparting of a rotative movement to the nipples will firmly draw the flange lip 25 of the sleeves against the receptacle bottom 20 and the nipple against the end of the flange about the opening in the receptacle bottom and forming a liquid tight connection with the receptacle. The closed end of the nipples is arranged with a plurality of discharge orifices 30, in the present instance shown as two in number, said orifices being arranged about the axis of the nipples and extend in an oblique or inclined direction to the axis of the nipples, as clearly shown in Figure 11, to spread and direct the flow of the liquid toward the wall of the receptacles being filled, which it has been found displaces the air from the receptacles without the creation of air bubbles or foam. The outer surface of the nipple members are knurled to facilitate the mounting and connecting of the same to the sleeves.

Figures 3, 4:
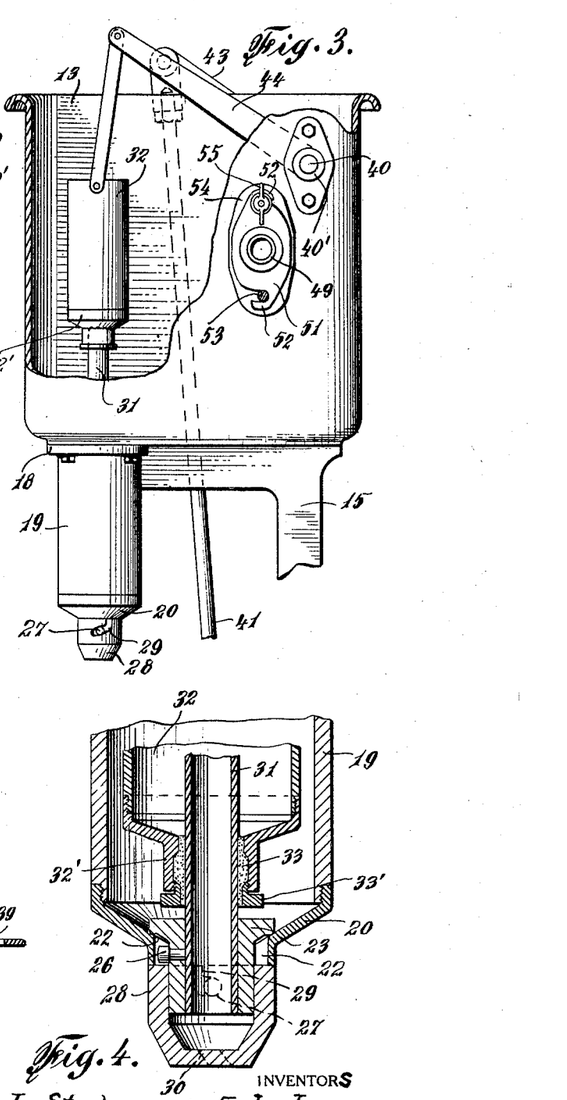
Figure 3 is a fragmentary view in elevation of the tank partly broken away and showing the material measuring and delivering means in material delivering position.
Figure 4 is a longitudinal sectional view of the lower portion of the measuring and delivery means to show the mounting of the measuring means in relation to the outlet means, and an improved arrangement and mounting of the discharge nozzle.

The filling means are arranged to measure and deliver to the nozzles a predetermined quantity of liquid from the tank at timed intervals. For this purpose tubes 31 are fixed at one end in the bore of the nozzles 23, as by sweating or other appropriate method, said tubes extending up through the tank receptacles and into the tank with the top end opening to the tank above the liquid level therein providing an open passage from the tank to the nozzle out of communication with the liquid in the tank. The liquid is delivered from the tank in measured quantities to the tube 31 by cylindrical open end containers 32, which are in the nature of dippers, adapted to hold the predetermined quantity of liquid to be delivered. The bottom of the dippers have a reduced portion 32' extended outward therefrom with a bore therethrough of slightly larger diameter than the outer diameter of the tubes 31 for the slidable engagement of the dippers on said tubes. To provide a liquid tight connection between the dippers and tubes the reduced dipper portions 32' are arranged as stuffing boxes, for which purpose packing is interposed between the wall of the bore of said reduced portion and the tubes and firmly seated therein by arranging the bore of said reduced portion with an annular enlargement, as shown at 33 in Figure 4, and threading a flanged gland 33' into the outer end of the reduced portion serving to crowd the packing between the wall of the reduced portion and the tube. The bottom of the dippers are preferably removable and connected to the body portion of the dippers, and may be connected thereto in the same manner as the bottom 20 of the tank receptacles are connected with the body of said receptacles to form a tight seal joint. The opposite or top ends of the dippers are open to the tank, as shown at 34. The dippers are of a diameter so that the same will have free vertical movement into and out of the tank receptacles 19, and of such a length that in the lowermost position thereof the open end of the dippers will be below the bottom of the tank and in communication with the contents of the tank.

The measuring devices or dippers are intermittently actuated on the tubes from a drive shaft 35 connected to a suitable source of power and rotatably mounted in bearings in hangers 36 suspended from the table 14. The shaft is operatively connected to the dippers by a clutch mechanism one member of which clutch mechanism, in the form of a disk 37, is slidable on and rotatable with the drive shaft. The other clutch member comprises a disk 38 loosely mounted on the drive shaft with a pin 38' fixed in and extending laterally from the hub of the disk adapted for engagement of a recess 37' in the clutch member 37 by a movement of the latter on the shaft by a lever 39 (Figures 2 and 6) operatively connected with said clutch member by pins engaging in a peripheral groove, as at 39', in said disk, said pins being carried by and extending inward from strap members extending around the clutch member and fixed at one end to the lever and at the opposite end pivotally mounted between ears of a bracket fixed to a shaft hanger 36, as at 36'. The drive shaft is operatively connected with a rock shaft 40 extended through openings in the wall of the tank and journaled in bearing members 40' mounted upon the exterior of the tank, by a rod 41 pivotally connected at one end with the clutch disk 38 eccentric to the axis thereof, as at 42, and pivotally connected at the opposite end with an arm 43 fixed on the rock shaft. The dippers are operatively connected with and reciprocated along the outlet tubes 31 through the movement of the rock shaft 40 by an arm 44 fixed on the rock shaft and having a portion 45 at the free end extending transversely of the arm and in parallel relation to the rock shaft, and from which extend perforated projections 46 to which the dippers are connected by pairs of links 47, each pair of links being pivotally mounted at one end at opposite sides of each one of the projections by securing the links upon studs engaged in the perforations in said projections, as at 48, the links diverging from said connection to a part engaged at opposite sides of the dippers and pivotally connected thereto by headed pins passed through perforations in the ends of the links and secured in the dippers, the links and the connection thereof with the arm 44 being arranged so as not to interfere with the tubes 31 during the movement of the dippers thereon.

The inlet openings of the tubes 31 are at all times open to the tank above the level of the liquid therein and in order to maintain the liquid at such a level the tank is arranged with liquid inlet means having an outlet into the tank with a float controlled valve. This inlet means comprises a conduit 49 connected to a supply of liquid at some exterior point, said conduit being extended through and removably mounted in an opening 50 in the side wall of the tank of larger area than the diameter of the conduit by a mounting plate 51 larger than said opening fixed to the conduit and secured to the tank in abutting relation to a boss 54 extended around the opening. The conduit mounting plate is connected to the tank by engaging hook portions 52 oppositely arranged on the mounting plate over threaded studs 53 fixed in and extending laterally from the boss 54, and secured to the studs 53 by thumb nuts 55 threaded onto said studs. The conduit is of right angle form with the one angle portion within the tank having the outlet end therein arranged adjacent the bottom of the tank and controlled by a valve 55'. The valve comprises a disk fixed to a stem pivotally mounted on an arm 56 loosely engaged on a pin 57 fixed in and extending laterally from a lug 58 integral with a collar 59 fixed upon the end of the conduit, the valve carrying arm 56 being retained on the pin 57 by a latch 60 pivotally supported on a headed stud 61 threaded into a boss extended laterally from the lug 58 and normally assuming a position by gravity in engagement with a lug on the collar, as at 62, at the end of the valve arm carrying pin 57 and thus preventing said arm from being disengaged from said pin. The valve 55' is adapted to be seated against a seat formed in the collar 59 to shut off the flow of liquid through the conduit and moved away from the same to open the conduit to the tank. To control the delivery of liquid to the tank and maintain the liquid at a predetermined level and below the inlet to the discharge tubes 31 a float 63 is carried at one end of a Z shaped rod 64 the opposite end of which rod is fixed in the valve carrying arm 56 at the end thereof opposite to that at which it is pivotally supported.

The mounting of the conduit by the plate 51 permits of the removal of the conduit from the tank for cleaning or other purposes through the opening 50 by loosening the thumb nuts 55 and disengaging the plate hooks 52 from the studs 53. To withdraw the conduit through the opening 50 the valve and float carrying arm 56 is disengaged from the pin 57 by moving the latch 60 away from the end of the pin 57.

Figure 1:
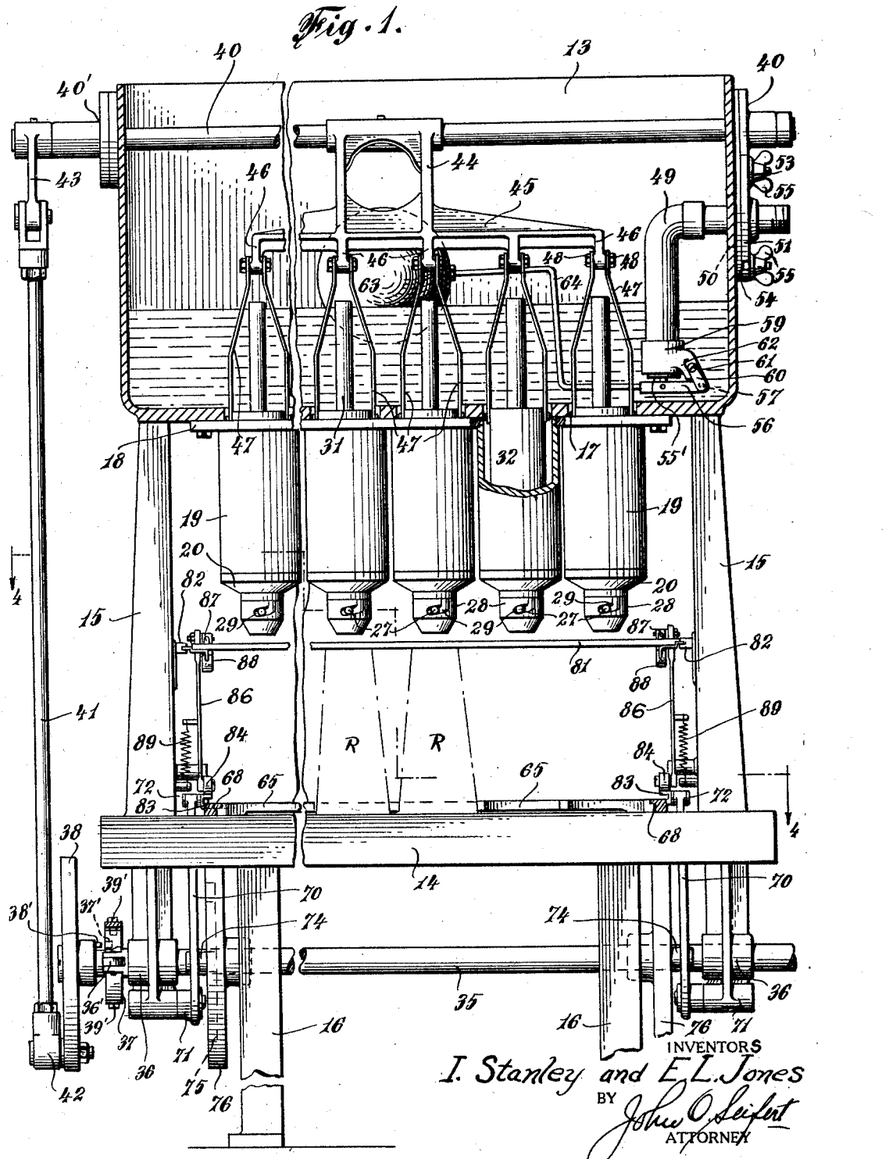
Figure 1 is an elevational view looking at the front of the apparatus, and partly in section to show the measuring and delivering means, the actuating means therefor and valve controlled inlet means to the tank.
Figure 2:
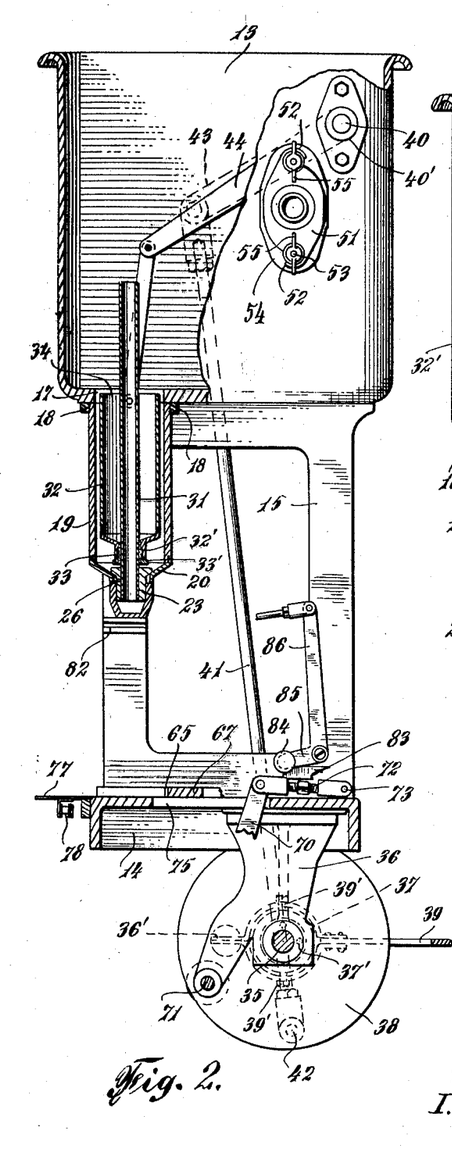
Figure 2 is a side elevational view looking at the right of Figure 1 and partly broken away to show the construction and arrangement of the material measuring and delivering means.

The measuring devices or dippers in the lowermost position in the tank receptacles 19 are in communication with the liquid in the lowermost portion of the tank, as shown in Figures 1 and 2 and assures the filling thereof. In this position of the dippers as the dipper carrying shaft 40 is rocked from the drive shaft through its connection therewith, the dippers are moved upward on the discharge tubes 31, and as the dippers move above the tubes the liquid will drain from the dippers into the tubes and discharge through the nozzle 28 into receptacles R alined on the table 14 with the discharge nozzles. The movement of the dippers on the tubes is such that when the dippers are in their uppermost position the inlets to the tubes will be flush with the bottom of the dippers and thus assuring the draining of all of the contents from the dippers.

Figure 5:
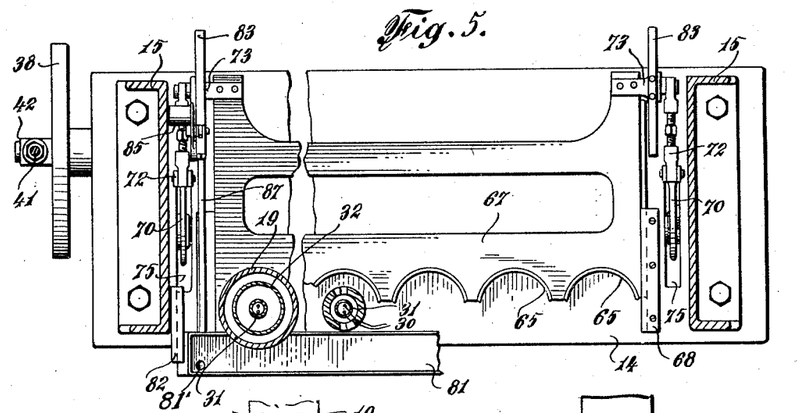
Figure 5 is a plan view taken on the line 4—4 of Figure 1 looking in the direction of the arrows, and showing the receptacle positioning and transferring means in receptacle filling position.
Figure 6:
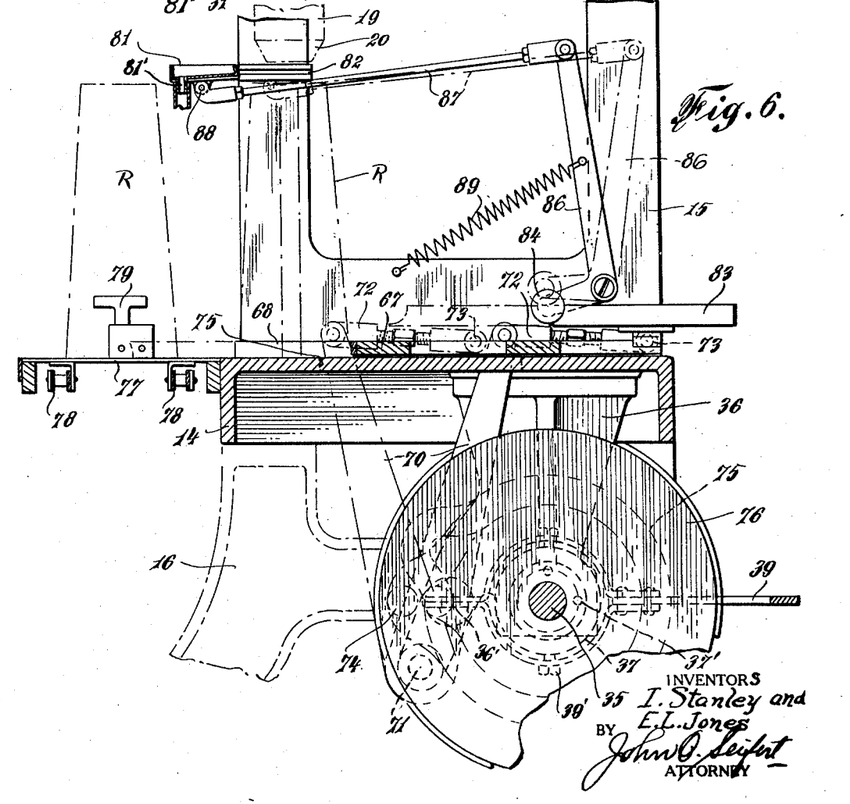
Figure 6 is a cross sectional view, on an enlarged scale, to show the arrangement of the receptacle positioning and transferring means and the drip pan and actuating means therefor, as well as the conveyor in relation to the receptacle supporting table.

The receptacle R, in the present instance of conical form as shown in dot and dash lines in Figures 1 and 5 and in full lines in Figure 6, are manually positioned on the table relative to the outlet means, and to aline the receptacles on the table with said outlet means they are engaged with gauge members 65 of arcuate shape corresponding to the shape of the receptacles, fixed in correspondingly formed recesses in the front edge of a slide or rectangular frame 67 slidably mounted at the ends in gibs on the table 14, as shown at 68, to be reciprocated into two positions, one position being with the gauge members positioning the receptacles in alinement with the outlet means, and in the other position transferring the receptacles away from said outlet position. The slide is reciprocated from the drive shaft alternately and in timed sequence with the operation of the measuring and delivery means by levers 70 pivotally supported on studs carried by extensions of the shaft supporting hangers 36, as at 71, the opposite end of the levers extending through slots in the table and connected with the slide by adjustably connecting links or turnbuckles 72 pivotally connected at one end of the levers and at the opposite end with studs on brackets 73 fixed to the rear corners of and extending laterally from the slide. The levers are oscillated to reciprocate the slide by rollers 74 carried by the levers engaging in cam grooves 75 in disks 76 fixed on the shaft 35. The rotation of the cam disks 76 and the engagement of the cam following rollers carried by the levers 70 in the cam grooves in the disks impart oscillatory movement to the arms 70, thereby reciprocating the slide from the rearward or receptacle alining position shown in full lines in Figure 5 to the forward or receptacle transferring position thereof, as shown in dot and dash lines in Figure 1. The cam grooves are arranged in the disks to actuate the levers and slide alternately with the actuation of the measuring and delivery devices 32, so that when said devices are raised into communication with the inlet ends of the tubes 31 the slide 67 is in its rearward position alining the receptacles below the outlet means to receive the liquid from the tubes, and during the downward movement of the dippers 32 on the outlet tubes the slide 67 is actuated to its forward position to transfer filled receptacles from the table onto an intermittently operated conveyor 77 juxtaposed to the table and mounted by a chain belt 78 on suitable driving means, not shown, to travel in a plane coincident with the top of the table 14, and the receptacles being delivered from the table between resilient vertically extending and opposed fingers 79 carried by the disk of the conveyor chain and alined with the gauge members during the periods of rest of the conveyor to transport the receptacles to means to apply closure means to the open end of the receptacles.

To prevent the deposit and accumulation of drippings from the outlet means onto the table and the means to aline receptacles on the table with the outlet means and the transferring of the filled receptacles from the table, means are provided arranged to be positioned below the outlet means during the period of the actuation of the means to transfer filled receptacles from the table, and moved away from the outlet means when the transferring means is positioned to aline the receptacles with the outlet means to be filled. This means comprises a drip pan 81 slidably mounted at the ends in slideways in members 82 fixed to the standards 15, said pan being adapted to be moved to position below and away from the outlet means through the movement of the slide 67 by rails 83 carried by the stud carrying brackets 73, said rails being arranged with a recess in the forward ends for the engagement of rollers 84 rotatably carried by a short arm 85 of bell crank levers pivotally mounted on the standards 15, with a long arm 86 of said levers connected to the ends of the drip pan by connecting rods 87 pivotally connected to the ends of the arms 86 and to lugs extending from the bottom of the pan, as at 88, the drip pan being moved and positioned away from the outlet means when the rollers 84 are engaged in the rail recesses in the rearward position of the slide, and during the forward movement of the slide the rollers riding upon the top of the rails 83 and moving the end of the arms 86 backward and thus actuating the drip pan to move it below the outlet means, as shown in dot and dash lines in Figure 6. The levers are yieldingly urged in a direction to engage the rollers 84 with the rails by springs 89 attached at one end to the lever arms 86 and at the other end to a connecting member of the standards 15, said springs also causing the rollers to engage the recesses at the forward end of the rails and move the pan to position away from below the outlet means. The front portion of the drip pan is of greater depth than the rear portion to cause accumulated dripping therein to flow toward the front wall and drain through an opening 81' in the bottom thereof to which a flexible hose may be connected to deliver the material to a suitable receptacle to receive the same. The rear wall of the pan is inclined forwardly to prevent sloshing of any drippings over said wall as the pan is moved forward away from the outlet means.

While the apparatus is adapted to fill receptacles of any form, it is particularly adapted for use in connection with the filling of paper receptacles of conical form made by forming a blank to tubular form and securing the blank at the longitudinal marginal portions by means of a strip secured to said edge marginal portions at the outer side of the receptacles. To close the receptacles the open end is collapsed or squeezed together and sealed in collapsed condition by engaging a sealing member over and clamping the same to the collapsed receptacle end. The present apparatus is designed for use in connection with means for collapsing the receptacles and applying sealing members to the collapsed receptacle ends to which means the filled receptacles are transported by the conveyor as they are transferred thereto from the table of the filling means. To efficiently seal the receptacles it is essential that the receptacle end be collapsed with the side sealing strip in predetermined position. For this purpose the arcuate gauge members 65 of the slide 67 are of greater width at the top than at the bottom and the inner surface or front wall of said members is inclined from the top to a point intermediate the top and bottom of said members forming a sharp angle at the juncture of the inner surface and top of the gauge members, as clearly shown at 66 in Figure 7, and also forming projections at the ends for the engagement therewith of the edge of a strip extending longitudinally of the receptacle to secure the blank from which the receptacle body is formed and thus positioning the receptacles in predetermined relation to the slide 67, as shown at 69 in said Figure 7. The part 66 of the gauge members is also adapted to engage over an annular enlargement or bead 80 at the bottom of the receptacle body and thus retain the receptacles upon the table during the transferring movement thereof and prevent the possibility of the receptacles tipping over during such movement.

It will be obvious that various modifications may be made in construction and arrangement of parts, and that portions of the invention may be used without others and come within the scope of the invention.

Having thus described our invention we claim:

1. In receptacle filling apparatus, a liquid carrying tank arranged with liquid inlet means, float controlled valve mechanism for said inlet means to maintain the liquid at a predetermined level in the tank, a series of outlet tubes leading from above the liquid in the tank through the bottom of the tank, devices to measure and deliver successively predetermined quantities of liquid through the outlet tubes from the tank, a drive shaft, means to intermittently actuate said measuring and delivering devices from the drive shaft, a receptacle supporting table below the tank, reciprocatory means above the table operative intermittently and alternately with the measuring devices arranged for the engagement of receptacles to aline receptacles on the table relative to the outlet tubes during the periods of rest of said means and transfer such receptacle when filled away from the outlet tubes, a drip pan slidably mounted to have reciprocatory movement in a plane below and transversely of the outlet tubes and normally urged to position away from the outlet tubes with the receptacle alining and transferring means in position to aline receptacles with the outlet tubes, and means to position the pan below the outlet tubes during the receptacle transferring movement of said receptacle alining and transferring means.

2. In receptacle filling apparatus, a liquid carrying tank, a receptacle extended from and in communication with an opening through the bottom of the tank, a discharge tube mounted centrally in the bottom of and opening to the exterior of said receptacle and extending up into the tank above the liquid level therein, a liquid measuring and delivering device slidably mounted on said tube to have movement into the receptacle to receive a predetermined quantity of liquid from the tank and movement on the tube out of the receptacle to deliver the liquid therefrom into and discharge the same through the tube, a support for a liquid receiving receptacle below the outlet tube of the tank receptacle, means to position the liquid receiving receptacle on the support in alinement with the outlet tube of the tank, said means being reciprocatory and operative to transfer a filled receptacle from position below the tank receptacle, a movably supported pan adapted to be moved to position below and away from the tank receptacle, spring actuated means normally urging the pan to position away from below the tank receptacle, and such means actuated by the receptacle positioning and transferring means during the receptacle transferring movement thereof to position the pan below the tank receptacle to receive drippings from the discharge tube.

3. In receptacle filling apparatus, a tank arranged with valve controlled inlet means and a series of outlet means, measuring devices intermittently operative to deliver predetermined quantities of material through said outlet means from the tank, a table to support receptacles below the tank, a slide reciprocably mounted on the table and arranged with a series of arcuate recesses for engagement and positioning of the receptacles below the outlet means in one position of the slide and operative to transfer the receptacles away from the outlet means, a conveyor to travel in juxtaposed relation to the table adapted to receive the receptacles transferred from the outlet means by the slide, and a drip pan slidably mounted to have movement in a plane below the outlet means, and means to move said pan to position below and away from the outlet means normally urged to position with the pan away from the outlet means, and said means being actuated by the slide in the movement thereof in transferring the receptacles onto the conveyor to position below the outlet means.

4. In receptacle filling apparatus, a tank arranged with outlet means, means intermittently operative to deliver the material from the tank in successive predetermined quantities through the outlet means, a receptacle support below the outlet means, a slide mounted on the table to have reciprocatory movement transversely of the table and adapted to be positioned at the end of one of its movements below the outlet means, said slide being arranged for the engagement and positioning of receptacles on the table relative to the outlet means and operative to transfer the filled receptacles laterally of and away from the outlet means, a drive shaft operatively connected with the delivery means and said slide to actuate the delivery means alternately and in timed sequence with the receptacle transferring movement of the slide, a drip pan slidably mounted independent of the slide to have movement in a plane transversely of and below the outlet means, and means to move the pan to position below and away from the outlet means and normally urged to position with the pan away from the outlet means and actuated to position the pan below the outlet means by and through the movement of the slide to transfer the filled receptacles laterally of the outlet means.

5. Receptacle filling apparatus as claimed in claim 4, wherein the pan is slidably mounted at the ends in supports for the tank upon the table, and the means to move the drip pan to normal position away from the outlet means and below the outlet means by the receptacle transferring movement of the slide comprises pivotally mounted bell crank levers, one arm of which levers is pivotally connected with opposite ends of the pan, and the other arm of the levers being adapted to ride upon the slide during the receptacle transferring movement thereof and thereby actuate the levers to position the pan below the outlet means and ride off the slide when the slide is returned to initial position, and springs connected with the levers operative to urge the levers in a direction to position the pan away from the outlet means.

6. Receptacle filling apparatus as claimed in claim 4, wherein the pan is slidably mounted at the ends in supports for the tank upon the table, and the means to move the drip pan to normal position away from the outlet means and below the outlet means by the receptacle transferring movement of the slide, comprises a pair of pivotally mounted bell crank levers, links pivotally connected to the pan and one arm of the levers, rollers carried by the other lever arms, springs to normally urge the levers in a direction to position the pan away from the outlet means and the rollers carried by the one arm of the levers into engagement with the slide, said levers being arranged whereby the rollers carried by the one arm of the levers will ride upon the slide during the receptacle transferring movement thereof and move the levers to position the pan below the outlet means against the tension of the lever operating springs and to ride off said slide at the termination of the return movement of the slide and permit of movement of the levers by the springs to position and maintain the pan away from the outlet means.

7. In receptacle filling apparatus, a tank arranged with outlet means, means intermittently operative to deliver the material from the tank in successive predetermined quantities through the outlet means, a receptacle supporting table below the outlet means, a slide mounted on the table to have reciprocatory movement transversely of the table and adapted to be positioned at the end of one of its movements below the outlet means, said slide being arranged for the engagement and positioning of receptacles on the table relative to the outlet means and operative to transfer the filled receptacles laterally of and away from the outlet means, a drive shaft operatively connected with the delivery means and said slide to actuate the delivery means alternately and in timed sequence with the receptacle transferring movement of the slide, and said slide being arranged with a series of arcuate recesses adapted to be positioned concentric with the outlet means in the normal position of the slide, and said recesses having gauge members mounted therein conforming to the shape of the recesses and the top portion of the inner surface arranged to overhang the lower portion for engagement over a projecting part at the bottom of the receptacles to hold the receptacles to the table and prevent tipping thereof by the movement of the slide, and an end wall of said gauges being arranged for the engagement of a projecting part of the receptacles to position the receptacles in predetermined relation to the outlet means.

8. In receptacle filling apparatus, a tank arranged with a series of tubular members extended from the bottom, tubes mounted in openings in the bottom of said members and extending into the tank above the liquid level therein, and measuring devices slidably mounted on the outlet tubes to have movement into and out of the tubular members for delivering a predetermined quantity of liquid simultaneously from the tank through each outlet tube, a table for supporting receptacles to be filled below the tank, means to position the receptacles on the table relative to and transfer the filled receptacles away from the outlets of the delivery tubes, a slidably supported pan, and means operative to move the pan to position below and away from the outlets of the delivery tubes, said means being normally urged to position with the pan away from the tube outlets and operative by and from the movement of the receptacle positioning and transferring means to transfer receptacles from the table to position the pan below the tube outlets.

IRVING STANLEY.
ELLIS L. JONES.